US012687988B2

(12) United States Patent
Ankilla et al.

(10) Patent No.: US 12,687,988 B2
(45) Date of Patent: Jul. 21, 2026

(54) HOST INDEPENDENT CONTROL OF STORAGE DEVICES USING CONTROL DEVICES

(71) Applicant: Sandisk Technologies, Inc., Milpitas, CA (US)

(72) Inventors: Mahipal Reddy Ankilla, Warangal (IN); Shubhi Khanna, Gurugram (IN)

(73) Assignee: Sandisk Technologies, Inc., Milpitas, CA (US)

( * ) Notice: Subject to any disclaimer, the term of this patent is extended or adjusted under 35 U.S.C. 154(b) by 134 days.

(21) Appl. No.: 18/830,183

(22) Filed: Sep. 10, 2024

(65) Prior Publication Data

US 2026/0072615 A1 Mar. 12, 2026

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| | | | |
|---|---|---|---|
| 8,106,783 B2 | 1/2012 | Wada et al. | |
| 2008/0015995 A1 | 1/2008 | Chen | |
| 2018/0217785 A1* | 8/2018 | Shin ...................... | G06F 3/0659 |
| 2018/0333587 A1* | 11/2018 | Howard ............. | A61N 1/37264 |
| 2021/0118582 A1* | 4/2021 | Lee ......................... | G06F 3/167 |

OTHER PUBLICATIONS

U.S. Appl. No. 18/232,305, filed Aug. 9, 2023.
U.S. Appl. No. 18/232,310, filed Aug. 9, 2023.

* cited by examiner

*Primary Examiner* — Farley Abad
(74) *Attorney, Agent, or Firm* — Patterson + Sheridan, LLP

(57) ABSTRACT

A data storage device can include a non-volatile memory, a sensor configured to detect an input from a control device, and control circuitry configured to: receive commands from one or more hosts or one or more control devices; detect an input from a control device using the sensor; determine whether the data storage device is connected to a host; in response to determining that the data storage device is not connected to a host, determine a command associated with the input, wherein the input is mapped to a specified command not involving data transfer; and perform one or more operations associated with the command.

20 Claims, 7 Drawing Sheets

600

HOST INDEPENDENT CONTROL OF STORAGE DEVICES USING CONTROL DEVICES

DETECT AN INPUT FROM A CONTROL DEVICE USING A SENSOR, WHEREIN A DATA STORAGE DEVICE INCLUDES A NON-VOLATILE MEMORY, THE SENSOR, AND CONTROL CIRCUITRY, AND IS CONFIGURED TO RECEIVE COMMANDS FROM ONE OR MORE HOSTS OR ONE OR MORE CONTROL DEVICES — 605

DETERMINE WHETHER THE DATA STORAGE DEVICE IS CONNECTED TO A HOST — 610

IN RESPONSE TO DETERMINING THAT THE DATA STORAGE DEVICE IS NOT CONNECTED TO A HOST, DETERMINE A COMMAND ASSOCIATED WITH THE INPUT, WHEREIN THE INPUT IS MAPPED TO A SPECIFIED COMMAND NOT INVOLVING DATA TRANSFER — 615

PERFORM ONE OR MORE OPERATIONS ASSOCIATED WITH THE COMMAND — 620

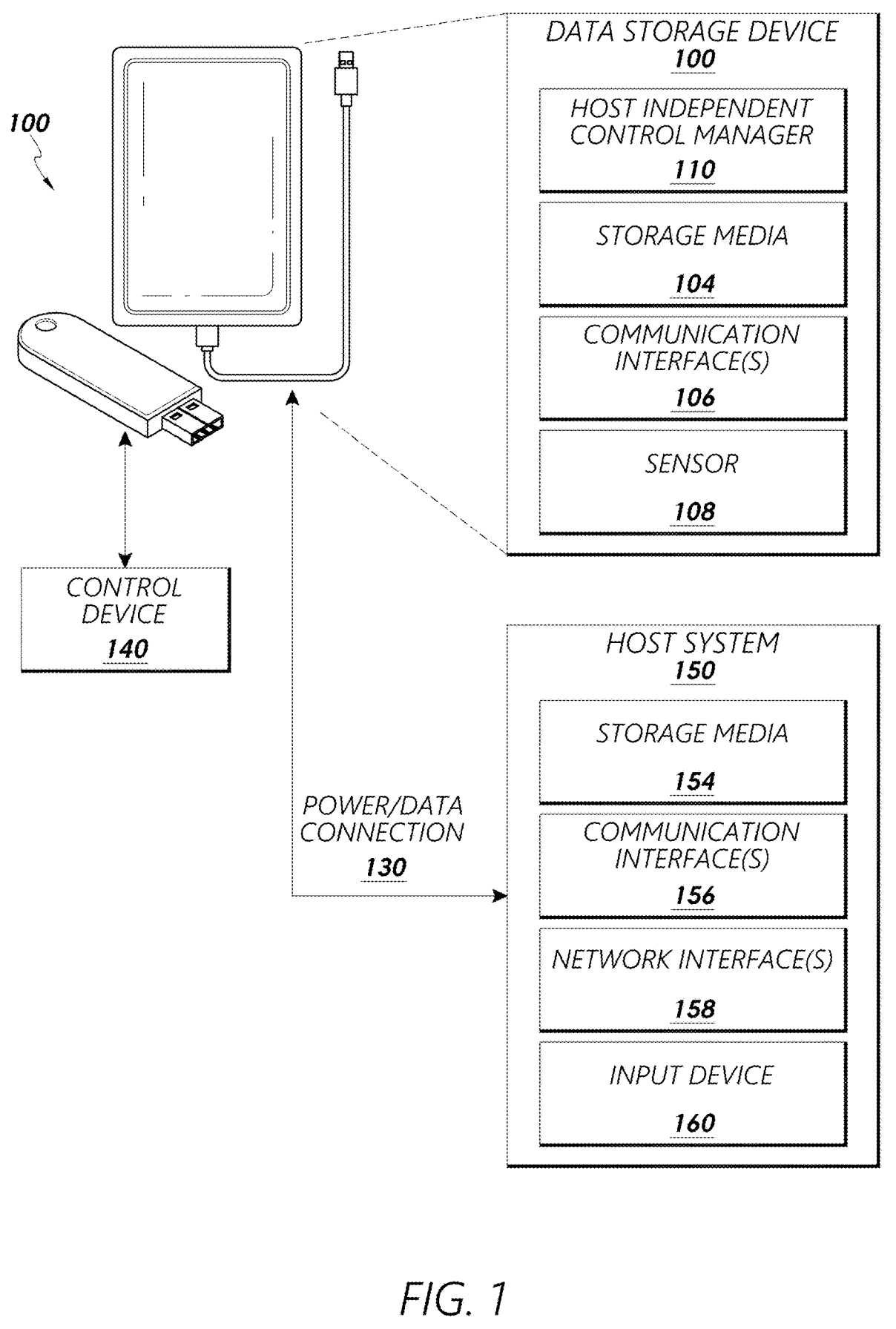

*100*

DATA STORAGE DEVICE
*100*

HOST INDEPENDENT CONTROL MANAGER
*110*

STORAGE MEDIA
*104*

COMMUNICATION INTERFACE(S)
*106*

SENSOR
*108*

CONTROL DEVICE
*140*

POWER/DATA CONNECTION
*130*

HOST SYSTEM
*150*

STORAGE MEDIA
*154*

COMMUNICATION INTERFACE(S)
*156*

NETWORK INTERFACE(S)
*158*

INPUT DEVICE
*160*

*FIG. 1*

CONTROL DEVICE

SEND INPUT
375

DATA STORAGE DEVICE

DETECT INPUT
380

MAP INPUT TO
HOST COMMAND
385

PERFORM
OPERATION(S)
ASSOCIATED WITH
HOST COMMAND
390

*370*

*300*

*316*

*308*

*318*

*340*

*300*

*316*

*308*

*318*

*340*

CONTROL DEVICE / DATA STORAGE DEVICE

SET UP FINGERPRINT COMMAND MAPPING
475

OBTAIN FINGERPRINT
480

MAP FINGERPRINT TO HOST COMMAND
485

PERFORM OPERATION(S) ASSOCIATED WITH HOST COMMAND
490

470

408/416

418

400

500
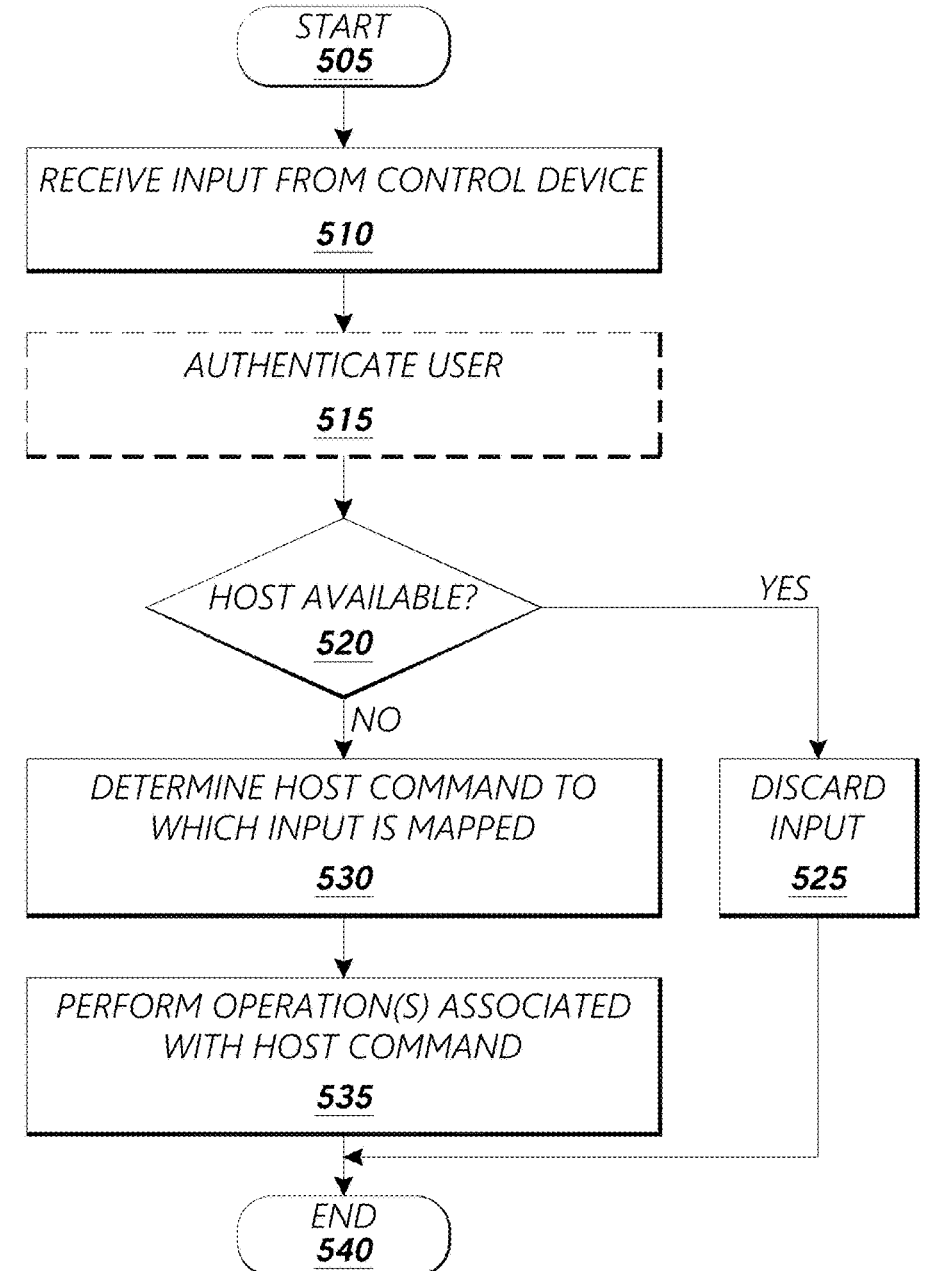
HOST INDEPENDENT CONTROL OF STORAGE
DEVICES USING CONTROL DEVICES
START
505
RECEIVE INPUT FROM CONTROL DEVICE
510
AUTHENTICATE USER
515
HOST AVAILABLE?
520
YES
NO
DETERMINE HOST COMMAND TO
WHICH INPUT IS MAPPED
530
DISCARD
INPUT
525
PERFORM OPERATION(S) ASSOCIATED
WITH HOST COMMAND
535
END
540
FIG. 5

Figure 6:
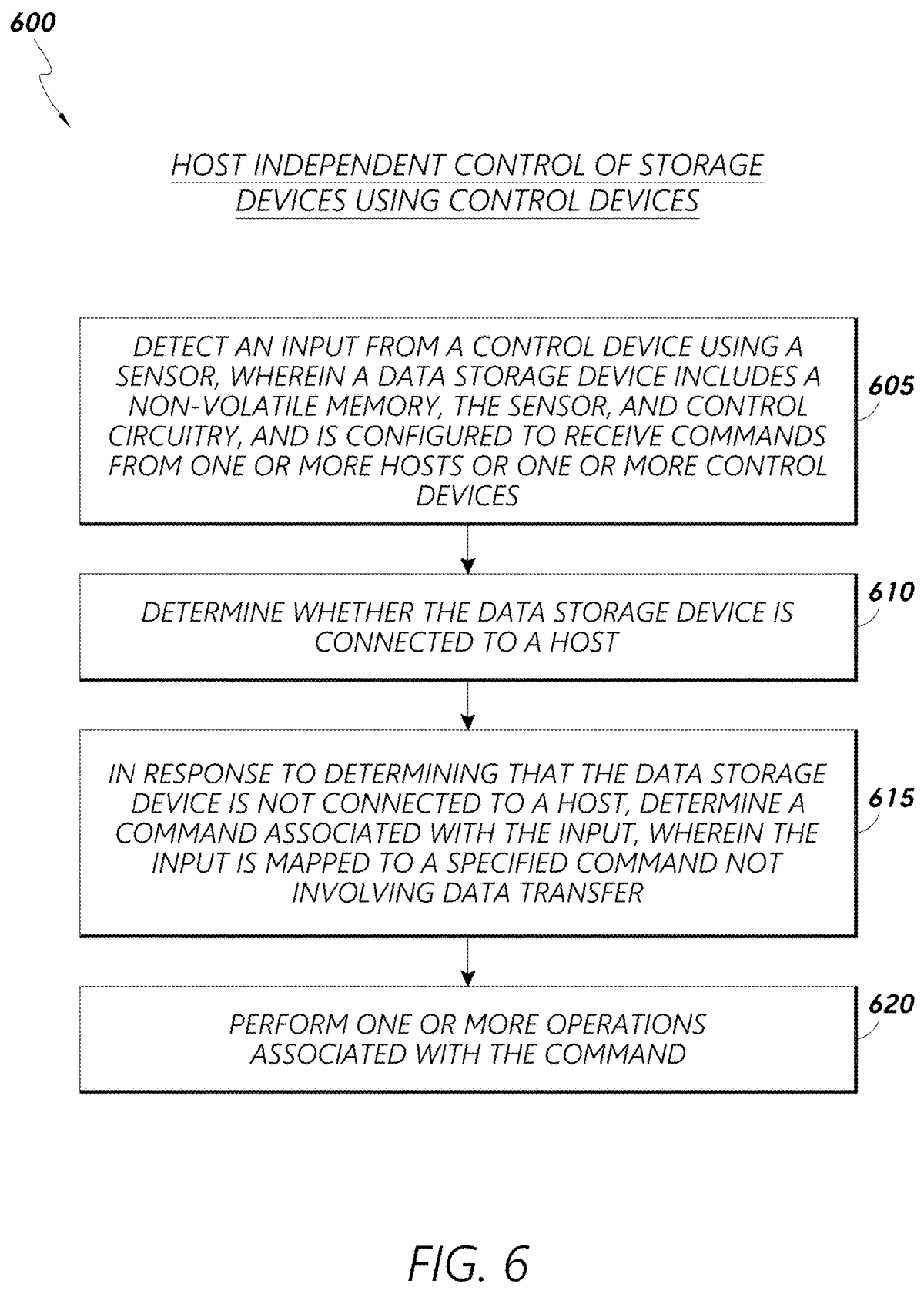

600

HOST INDEPENDENT CONTROL OF STORAGE
DEVICES USING CONTROL DEVICES

DETECT AN INPUT FROM A CONTROL DEVICE USING A
SENSOR, WHEREIN A DATA STORAGE DEVICE INCLUDES A
NON-VOLATILE MEMORY, THE SENSOR, AND CONTROL
CIRCUITRY, AND IS CONFIGURED TO RECEIVE COMMANDS
FROM ONE OR MORE HOSTS OR ONE OR MORE CONTROL
DEVICES

605

DETERMINE WHETHER THE DATA STORAGE DEVICE IS
CONNECTED TO A HOST

610

IN RESPONSE TO DETERMINING THAT THE DATA STORAGE
DEVICE IS NOT CONNECTED TO A HOST, DETERMINE A
COMMAND ASSOCIATED WITH THE INPUT, WHEREIN THE
INPUT IS MAPPED TO A SPECIFIED COMMAND NOT
INVOLVING DATA TRANSFER

615

PERFORM ONE OR MORE OPERATIONS
ASSOCIATED WITH THE COMMAND

HOST INDEPENDENT CONTROL OF STORAGE DEVICES USING CONTROL DEVICES

BACKGROUND

Field

This disclosure relates to data storage devices. More particularly, the disclosure relates to devices and methods for host independent control of data storage devices.

Description of Related Art

Data storage devices can perform various operations. For example, a data storage device can receive and process commands from a host. In many cases, a user may not be able to send commands to a data storage device without a connection to a host.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 1 illustrates a block diagram of a data storage device and a control device configured to provide host independent control of data storage devices, according to certain embodiments.

FIG. 5 illustrates a workflow process for providing host independent control in a data storage device, according to certain embodiments.

FIG. 6 illustrates a workflow process for providing host independent control in a data storage device, according to certain embodiments.

DETAILED DESCRIPTION

Figure 2:
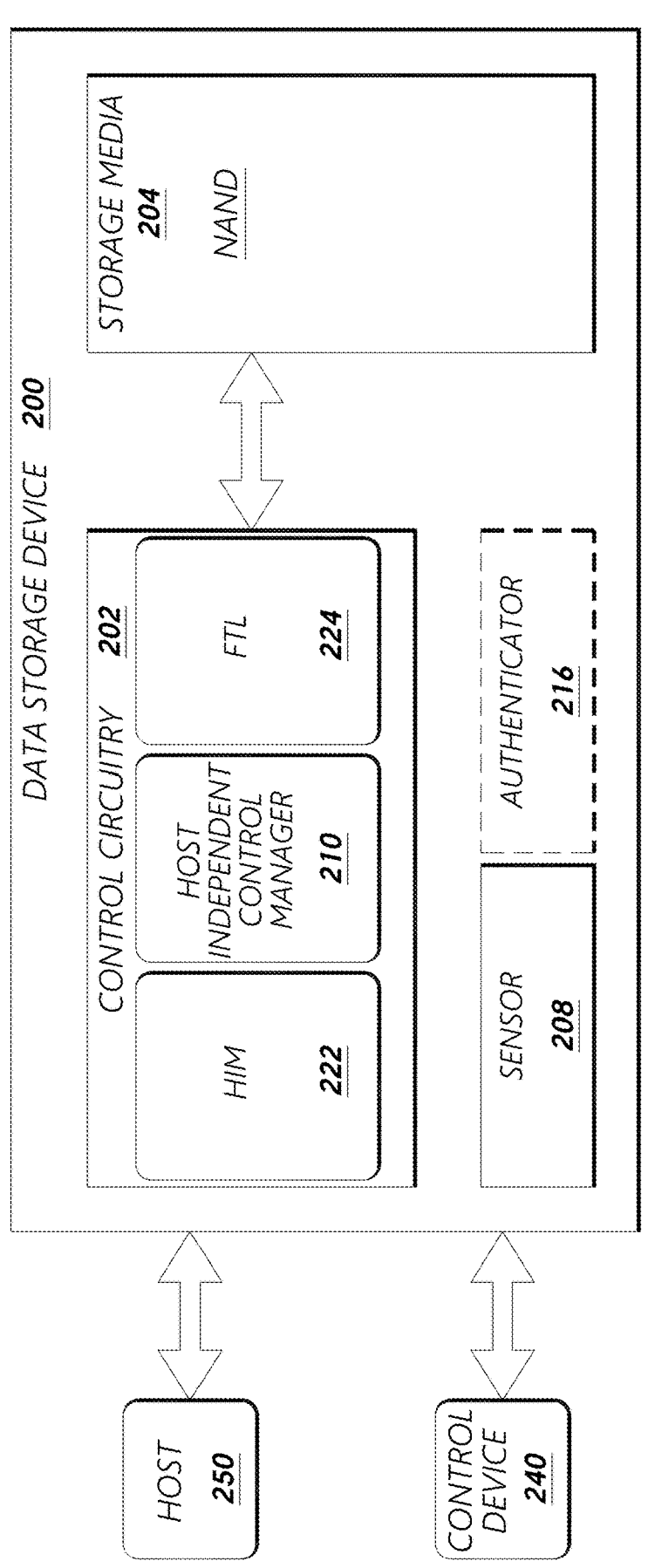
FIG. 2 illustrates a block diagram of an example data storage device configured to provide host independent control, according to certain embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

In many cases, a data storage device can receive and process commands from a host. For instance, a host can send a command to the data storage device to read or write data stored on the data storage device. A host may also send commands to the data storage device to lock, unlock, erase/format, power off, sleep, wakeup, etc. Examples of a host may include computing devices such as a computer, a laptop, and a mobile device, and a data storage device may connect to a host using a physical connection (e.g., Universal Serial Bus (USB)) or a wireless connection (e.g., Bluetooth, Wi-Fi, etc.). In some cases, a host may not be available, but a user may want to send commands to a data storage device. For example, a user may be giving a USB flash drive to another user and may want to erase data or format the USB flash drive. As another example, a user may want to lock the USB flash drive so that another cannot access the USB flash drive.

A data storage device according to certain aspects can provide host independent control to receive and perform commands without a connection to a host. For instance, a control device can be used to send at least some commands to the data storage device when the data storage device is not connected to a host. Examples of such commands may include commands not involving data transfer. A control device may be any device that can be used to communicate with the data storage device, for example, without having full capability of a host. A control device can be external to the data storage device or be integrated as a part of the data storage device. As an example, the control device can be a wavelength emitter and send different wavelengths to the data storage device. The data storage device can map wavelengths to different commands and perform associated commands when the data storage device receives a wavelength input from the wavelength emitter. In another example, the control device can be a fingerprint scanner/sensor, and the data storage device can map different fingerprints of a user to different commands. The data storage device can perform associated commands when the data storage device receives a fingerprint input. The data storage device can authenticate a user in connection with use of a control device such that only a user associated with the data storage device can send commands using the control device. By enabling users to send commands to the data storage device without a host, the data storage device implementing host independent control can provide flexibility in using the data storage device in various situations. Details relating to host independent control of data storage devices are further explained below in connection with FIGS. 1-7.

Host Independent Control of Data Storage Devices Using Control Devices

FIG. 1 illustrates a block diagram of a data storage device 100 and a control device 140 configured to provide host independent control of data storage devices, according to certain embodiments. The data storage device 100 can include a host independent control manager 110, storage media 104, a communication interface 106, and a sensor 108. The data storage device 100 can be an external storage device. The data storage device 100 can employ a variety of storage technologies and/or form factors. For example, the data storage device 100 may be a solid-state drive (SSD), Secure Digital (SD) card, a Universal Serial Bus (USB) memory stick that uses semiconductor memory as the storage media 104, etc. In other implementations, the data storage device 100 may be a hard disk drive (HDD) that uses magnetic disks as the storage media 104 or a solid-state hybrid drive (SSHD) that uses a combination of semiconductor memory and magnetic disk technology.

A host system 150 can include storage media 154, a communication interface 156, a network interface 158, and an input device 160. The storage media 154 can store data files and can include an SSD, SSHD, HDD, or the like. The communication interface 156 can provide a power and/or a data connection 130 to the data storage device 100. For example, the communication interface can be a USB port and associated controller. The network interface 158, such as Wi-Fi or ethernet, can enable the host system 150 to receive data from network servers from the Internet or other network over a network connection. The input device 160 can receive commands from a user. The host system 150 may be a computer, a laptop, a mobile device, or the like.

The data storage device 100 may communicate with a host system 150 to perform various operations. For example, the host system 150 can send different commands to the data storage device 100. According to certain aspects, commands that can be sent by a host system 150 to a data storage device 100 may also be referred to as host commands. The data storage device 100 may be coupled to the host system 150 over a physical connection (e.g. USB). For example, the data storage device 100 can be coupled to the host system 150 over a power/data connection 130 via a communication interface 106. The host system 150 may include a processor that can support various operations between the host system 150 and the data storage device 100, including read/write operations. The host system 150 can send commands to the data storage device 100 using a communication protocol, for example, for processing command and response packets. In some cases, the data storage device 100 may be coupled to the host system 150 over a wireless connection (e.g., Bluetooth, Wi-Fi).

In general, without a connection to a host system 150, a user may not be able to send commands to a data storage device 100. However, it can be helpful for a user to be able to send at least some commands to a data storage device 100 without a connection to a host system 150. For instance, a user may want to format the data storage device 100 before giving the data storage device 100 to another user or lock the data storage device 100 so that another user may not access the data storage device 100.

Accordingly, the data storage device 100 can be configured to communicate with and/or receive commands from a control device 140, for example, when a host system 150 is not available. The control device 140 can send various commands to the data storage device 100. In some embodiments, the control device 140 can send only a subset of host commands to the data storage device 100, for instance, commands that do not require a host system 150 to process. For instance, such commands can include commands that can be sent by a host system 150 which do not involve data transfer. Examples of such commands may include lock, unlock, erase/format, power on, power off, sleep, wakeup, etc. A control device 140 can be external to the data storage device 100 or be integrated as a part of the data storage device 100, depending on the embodiment. In some cases, the control device 140 and/or associated functionality on the data storage device 100 may be implemented using one or more peripheral components or devices, such as sensors. For instance, the data storage device 100 can include a sensor 108 that is configured to detect inputs or signals from a control device 140.

As an example, the control device 140 can be a wavelength emitter and send different wavelengths to the data storage device 100. The data storage device 100 can map wavelengths to different commands and execute associated commands when the data storage device 100 receives a wavelength input from the wavelength emitter. In another example, the control device 140 can be a fingerprint scanner/ sensor, and the data storage device 100 can map different fingerprints of a user to different commands. The data storage device 100 can execute associated commands when the data storage device 100 receives a fingerprint input. Many variations are possible. The data storage device 100 can authenticate a user in connection with use of a control device 140 such that only a user associated with the data storage device 100 can send commands using the control device 140. The control device 140 may include an interface that can enable a user to send different commands, such as one or more buttons or a graphical user interface (GUI).

A control device 140 may be any device that can be used to send commands to the data storage device 100, for example, without having full capability of a host system 150. For instance, the control device 140 may not include a processor that can handle typical data operations between the data storage device 100 and a host system 150, such as read/write operations. The control device 140 also may not support or utilize a communication protocol used by a host system 150 to send commands to the data storage device 100, such as a communication protocol for processing command and response packets. The type of input sent by a control device 140 may be different from input sent by a host system 150. For example, an input from a control device 140 can be sent without using a communication protocol that a host system 150 uses to send commands to the data storage device 100.

In order to receive and process commands from a control device 140, the data storage device 100 can have access to an available power source. For example, the data storage device 100 can obtain power from a battery or a USB cable that is plugged into a USB power socket. Initial setup of the data storage device 100 can be completed for data storage operations before receiving commands from the control device 140.

The host independent control manager 110 and/or other components of the data storage device 100 can be configured to communicate with and/or process commands from a control device 140. For instance, functionalities relating to host independent control may be performed by one or more components of control circuitry of the data storage device 100. The host independent control manager 110 can map various inputs from a control device 140 to corresponding commands. For example, the host independent control manager 110 may include a mapping table that maps inputs that can be sent by the control device 140 and commands. In case the control device 140 is a wavelength emitter, the host independent control manager 110 can map different wavelengths or wavelength ranges to different commands. In case the control device 140 is a fingerprint sensor, the host independent control manager 110 can map different fingerprints of a user to different commands. When an input is received from a control device 140, the host independent control manager 110 can determine to which command the input is mapped. The host independent control manager 110 may detect an input from a control device 140 using a corresponding sensor 108. After determining the command to which the input is mapped, the host independent control manager 110 can perform one or more operations associated with the command. The host independent control manager 110 may also provide an indicator relating to status of the command, for example, using one or more light-emitting diodes (LEDs), a display, etc.

In this way, a control device 140 can function as an alternate source of commands when a host system 150 is not available. Accordingly, the host independent control manager 110 can toggle between receiving commands from a host system 150 and a control device 140. If the data storage device 100 is connected to a host system 150, the host independent control manager 110 can discard any input or signal received from a control device 140. If the data storage device 100 is not connected to a host system 150, the host independent control manager 110 can process an input or signal received from a control device 140. According to certain aspects, the control device 140 may not be an actual host system 150 that supports all host commands, and any commands and/or operation(s) that require a host system 150 can be performed when a connection to a host system 150 is available. In other embodiments, the host independent control manager 110 may process commands from both a host system 150 and a control device 140 even when the data storage device 100 is connected to the host system 150.

The host independent control manager 110 can authenticate a user sending a command by a control device 140. For example, the data storage device 100 can include an authenticator. Any suitable authentication device/technique may be used, such as biometric identification, passwords, security tokens, etc. Details relating to the host independent control manager 110 and host independent control of data storage devices are described further in connection with FIGS. 2-7 below.

FIG. 2 illustrates a block diagram of an example data storage device 200 configured to provide host independent control, according to one or more embodiments. In some embodiments, components of FIG. 2 can be similar to components of FIG. 1 having similar names and/or reference numbers. For example, the data storage device 200 can be similar to a data storage device 100 in FIG. 1. Certain details relating to FIG. 2 are described above in connection with FIG. 1.

A data storage device 200 can communicate with a host 250. The data storage device 200 can also communicate with a control device 240. The data storage device 200 can include control circuitry 202, storage media 204, a sensor 208, and an authenticator 216. As shown in FIG. 2, the data storage device 200 is an SSD device, and the storage media 204 includes NAND arrays/memory. For example, the control circuitry 202 can include a controller. The control circuitry 202 may include various components. The control circuitry 202 can include hardware and/or software (e.g., firmware) for implementing host independent control, such as a host independent control manager 210. The control circuitry 202 can also include additional functionality. For example, the control circuitry 202 may support file-based storage. The control circuitry 202 can also include functionality for managing data transfers of the data storage device 200. The storage media 204 can store data. The sensor 208 can detect an input or signal from a control device 240. The authenticator 216 can authenticate a user using a control device 240. For example, the authenticator 216 can be a fingerprint sensor. In some embodiments, the sensor 208 can be a fingerprint sensor, and the sensor 208 can function as the control device 240. The fingerprint sensor can also function as the authenticator 216. Many variations are possible.

In some embodiments, the control circuitry 202 includes a host interface manager (HIM) 222, a flash translation layer (FTL) 224, and a host independent control manager 210. The control circuitry 202 may also include a processor, an error correction code (ECC) engine, and any other suitable component. The HIM 222 can manage interfacing and communication between the host 250 and the data storage device 200. Examples of the interface between the host 250 and the data storage device 200 may include peripheral component interconnect express (PCIe), serial advanced technology attachment (SATA), non-volatile memory express (NVMe), etc. The HIM 222 can receive various commands, such as read or write commands. The FTL 224 may handle translation of logical block addresses (LBAs) from the host 250 to physical addresses on the storage media 204 as well as garbage collection, wear leveling, etc. A processor can be configured to execute instructions related to processing various operations. An ECC engine can perform error correction for data, such as generating parity data.

The host independent control manager 210 can provide functionalities related to host independent control of the data storage device 200, for example, in combination with one or more other components of the data storage device 200, such as components of the control circuitry 202. The host independent control manager 210 may be implemented in firmware, which may be run on a controller chip. In some implementations, the host independent control manager 210 may be a specialized, hardware-based chip for implementing host independent control. The host independent control manager 210 may be implemented as one or more components or one or more modules. The host independent control manager 210 can be the same as or similar to a host independent control manager 110 in FIG. 1. The data storage device 200 and/or the control circuitry 202 may include additional or fewer components, depending on the embodiment.

Figures 3A, 3B, 3C:
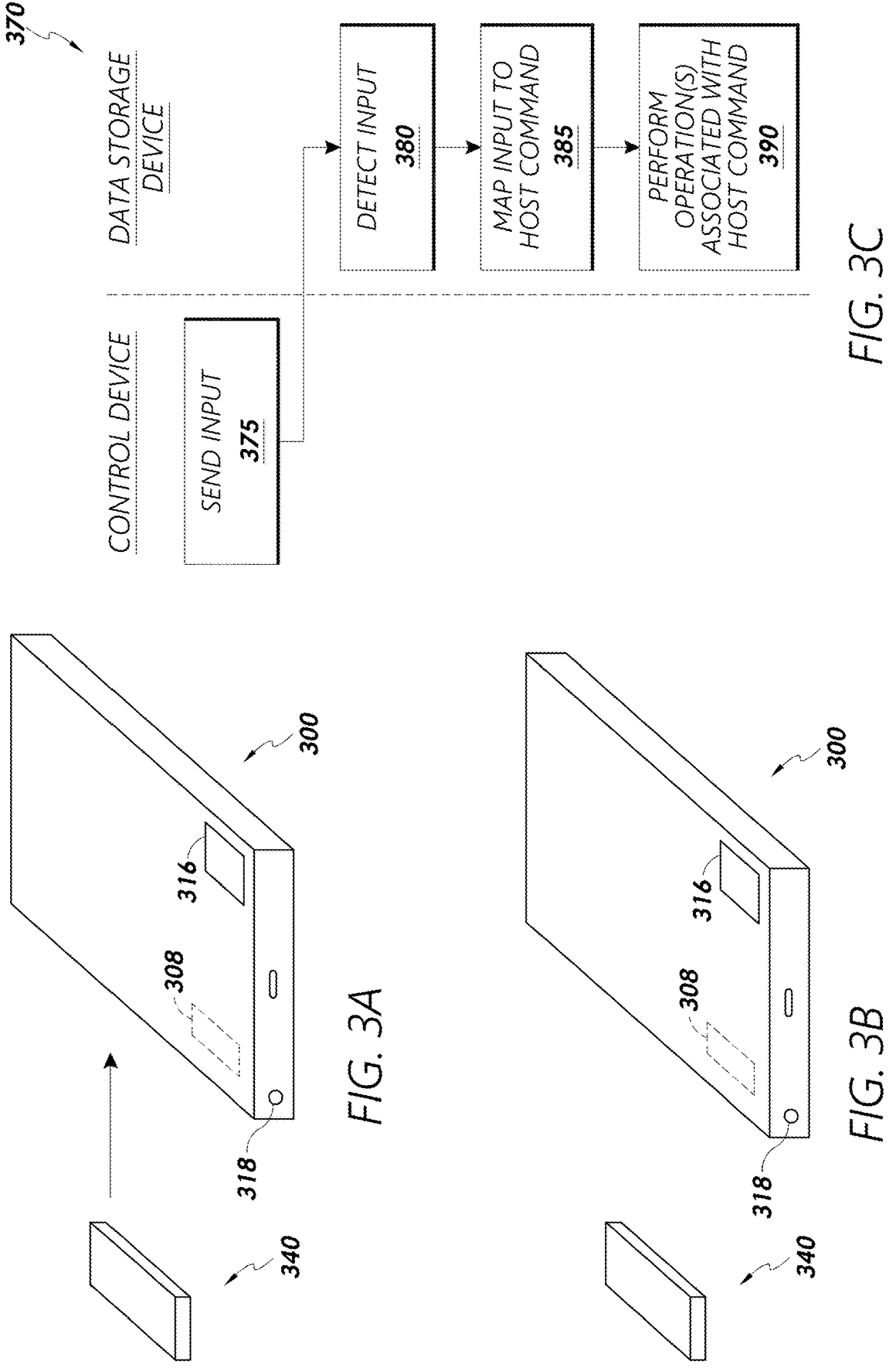
FIGS. 3A-3C illustrate a diagram of an example data storage device for providing host independent control and associated workflow process, according to certain embodiments.

FIGS. 3A-3C illustrate a diagram of an example data storage device 300 for providing host independent control and associated workflow process 370, according to certain embodiments. In some embodiments, components of FIGS. 3A-3B can be similar to components of FIGS. 1-2 having similar names and/or reference numbers. For example, the data storage device 300 can be similar to a data storage device 100, 200 in FIGS. 1-2. Certain details relating to FIGS. 3A-3C are described above in connection with FIGS. 1-2. Depending on the embodiment, the process 370 may include fewer or additional blocks, and the blocks may be performed in an order that is different from illustrated.

In FIGS. 3A-3B, a control device 340 can be a wavelength emitter. The data storage device 300 can include a sensor 308 for detecting a wavelength input. The data storage device 300 can also include an indicator 318 that can provide progress information relating to a command. As an example, the indicator 318 may include one or more LEDs. The data storage device 300 may further include an authenticator 316, such as a fingerprint sensor, that can be used to authenticate a user sending the wavelength input using the control device 340. As described above, a control device 340 can include any device that may send input which can be mapped to commands to a data storage device 300 without having full capability of a host. In FIG. 3A, the control device 340 can send an input or signal to the data storage device 300. In FIG. 3B, the data storage device 300 can perform various operations in response to the input or signal from the control device 340.

FIG. 3C illustrates a workflow process 370 relating to host independent control of a data storage device 300. Block 375 can be performed by the control device 340, and blocks 380-390 can be performed by the data storage device 300. For instance, block 375 can be associated with FIG. 3A, and block 380-390 can be associated with FIG. 3B.

At block 375, the control device 340 can send an input or signal to the data storage device 300. Different inputs or signals that can be sent by the control device 340 may be mapped to different host commands that can be sent to the data storage device 300. For a wavelength emitter, different wavelengths or wavelength ranges can be mapped to different host commands. Table 1 shows an example mapping of host commands and wavelengths. Wavelengths are indicated in nanometers (nm).

TABLE 1

| Command/Operation | Wavelength |
|---|---|
| Lock | V nm |
| Erase/Format | W nm |
| Unlock | X nm |
| Power On/Off | Y nm |
| Sleep/Wakeup | Z nm |

Any suitable wavelengths for sending an input to the data storage device 300 may be used. Wavelengths can relate to light, sound, etc. In some cases, wavelengths may include visible spectrum, infrared spectrum (IR), etc. Many variations are possible. The control device 340 can provide a user interface that can be used to select a host command to send to the data storage device 300, such as a GUI, one or more buttons, etc. For instance, the control device 340 can display a list of host commands that can be sent to the data storage device 300 and send a wavelength input corresponding to a selected host command to the data storage device 300. In some cases, the control device 340 does not have full functionality of a host and does not include a processor capable of processing all host commands including read/write operations. Accordingly, the control device 340 can send host commands that do not involve data transfer, such as read/write operations. In certain embodiments, the control device 340 may support all host commands.

At block 380, the data storage device 300 can detect an input or signal sent by the control device 340 using the sensor 308. For example, the sensor 308 can be configured to determine a wavelength or wavelength range that is received as the input. Any suitable technique may be used to detect and determine the wavelength or wavelength range. If the data storage device 300 includes an authenticator 316, the data storage device 300 can authenticate a user sending the input or signal using the control device 340. For example, authentication of the user can activate the sensor 308 for detecting the input or signal. In certain embodiments, authenticating the user may be optional. In some cases, multiple users may be associated with the data storage device 300, and the data storage device 300 can authenticate multiple users.

At block 385, the data storage device 300 can map the input or signal to a host command. The data storage device 300 can determine a host command to which the detected input or signal corresponds. For example, the data storage device 300 can refer to a mapping table that stores a mapping of control device inputs and host commands. Examples of commands may include lock, unlock, erase/format, power on, power off, sleep, wakeup, etc.

At block 390, the data storage device 300 can perform operation(s) associated with the host command. For instance, the data storage device 300 can display or indicate the status of processing the host command and/or the operation(s) using the indicator 318. As an example, if the indicator 318 is an LED, the indicator 318 can display a green color when the host command and/or the operation was successful and display a red color when the host command and/or the operation failed.

Figure 4B:
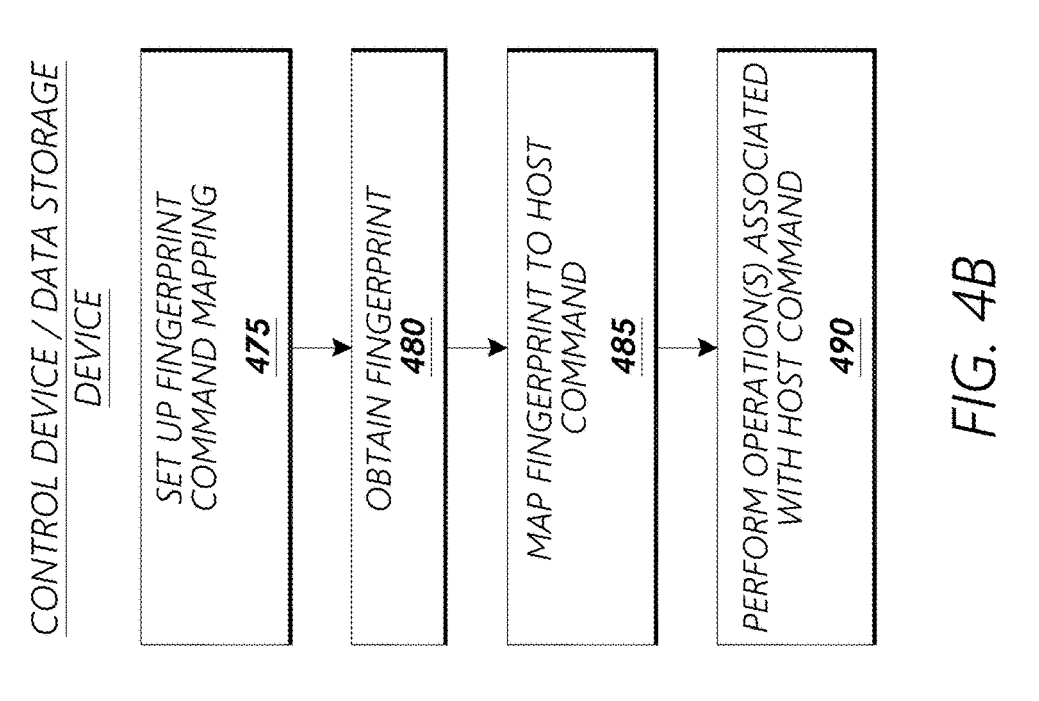
FIGS. 4A-4B illustrate a diagram of an example data storage device for providing host independent control and associated workflow process, according to certain embodiments.
Figure 4A:
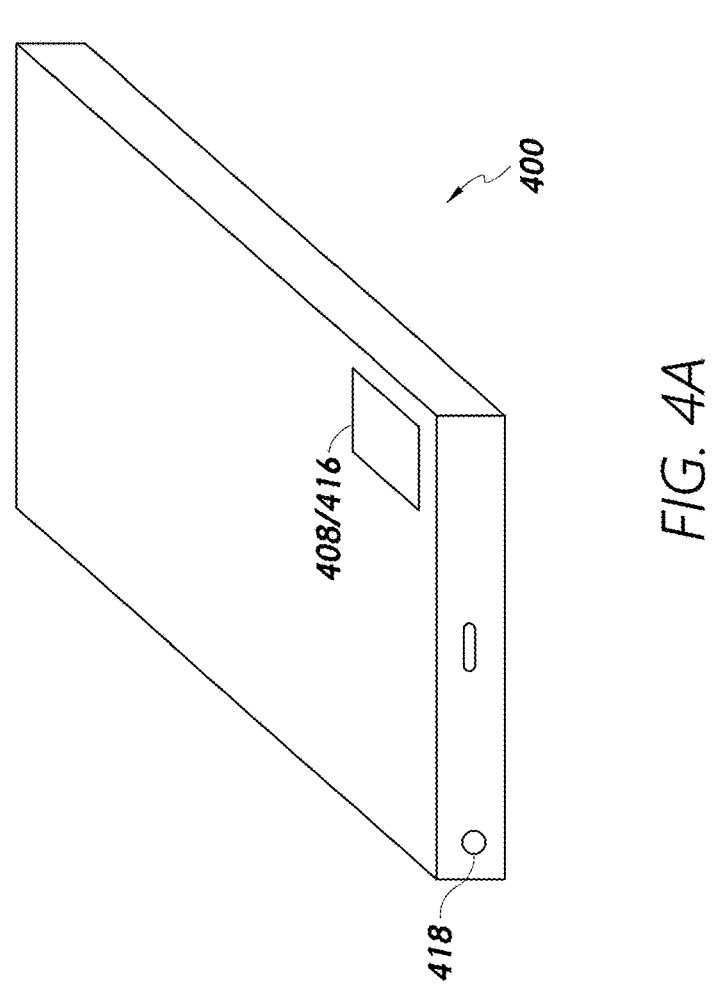

FIGS. 4A-4B illustrate a diagram of an example data storage device 400 for providing host independent control and associated workflow process 470, according to certain embodiments. In some embodiments, components of FIG. 4A can be similar to components of FIGS. 1-3B having similar names and/or reference numbers. For example, the data storage device 400 can be similar to a data storage device 100, 200, 300 in FIGS. 1-3B. Certain details relating to FIGS. 4A-4B are described above in connection with FIGS. 1-3C. Depending on the embodiment, the process 470 may include fewer or additional blocks, and the blocks may be performed in an order that is different from illustrated.

In FIG. 4A, the data storage device 400 can include a sensor 408 that can also function as a control device. For example, the sensor 408 can be a fingerprint sensor, and the sensor 408 can obtain a fingerprint input that can be mapped to a host command. In this case, a separate control device that is external to the data storage device 400 is not needed. The sensor 408 may also function as an authenticator 416. For instance, the fingerprint sensor can be used to receive commands as well as authenticate a user. The data storage device 400 can also include an indicator 418 that can provide progress information relating to a command. As an example, the indicator 418 may include one or more LEDs.

FIG. 4B illustrates a workflow process 470 relating to host independent control of a data storage device 400. At block 475, the data storage device 400 can set up fingerprint command mapping, for example, in response to user input. A user can set up fingerprint host command mapping on the data storage device 400 using the fingerprint sensor 408. The user can register fingerprints for different fingers and map different host commands for the different fingerprints. The data storage device 400 can store such mapping information in a mapping table. If multiple users are associated with the data storage device 400, each user can set up fingerprint host command mapping. Table 2 shows an example mapping of fingerprints of a user and host commands.

TABLE 1

| Fingerprint | Command/Operation |
|---|---|
| Fingerprint 1 | Lock |
| Fingerprint 2 | Erase/Format |
| Fingerprint 3 | Unlock |
| Fingerprint 4 | Power On/Off |
| Fingerprint 5 | Sleep/Wakeup |

Each unique fingerprint of a particular user may be mapped to a distinct host command. For example, fingerprints for different fingers can be registered and mapped to host commands. Fingerprints for both hands may be used. Many variations are possible. Fingerprints may be registered when the data storage device 400 is connected to a host, for example, via a user interface. Since the control device/sensor 408 may not have full functionality of a host and does not include a processor capable of processing all host commands including read/write operations, the control device/sensor 408 can send host commands that do not involve data transfer, such as read/write operations. In certain embodiments, the control device/sensor 408 may support all host commands. Block 475 can be performed initially to set up the data storage device 400 to receive commands using fingerprints, and blocks 480-490 may be performed subsequently each time a user sends a command using a fingerprint.

At block 480, the data storage device 400 can obtain a fingerprint input using the fingerprint sensor 408. The fingerprint sensor 408 also functions as the authenticator 416, and the data storage device 400 can authenticate a user sending host commands using fingerprints. In some cases, a fingerprint input may be used to authenticate the user and also send a host command. In certain embodiments, authenticating the user may be optional. If multiple users may be associated with the data storage device 400, the data storage device 400 can authenticate multiple users. In the case of the fingerprint sensor 408, the fingerprint sensor 408 can act as the control device, the sensor 408, and the authenticator 416 all in one, and no additional peripheral components may be needed on the data storage device 400 to implement host independent control.

At block 485, the data storage device 400 can map the fingerprint input to a host command. The data storage device 400 can determine a host command to which the obtained fingerprint corresponds. For example, the data storage device 400 can refer to a mapping table that stores a mapping of fingerprint inputs and host commands. Examples of commands may include lock, unlock, erase/format, power on, power off, sleep, wakeup, etc.

At block 490, the data storage device 400 can perform operation(s) associated with the host command. For instance, the data storage device 400 can display or indicate the status of processing the host command and/or the operation(s) using the indicator 418. As an example, if the indicator 418 is an LED, the indicator 418 can display a green color when the host command and/or the operation was successful and display a red color when the host command and/or the operation failed.

In the example of FIGS. 4A-4B, the control device/sensor 408 uses fingerprints as input, but other biometric identification information may also be used as appropriate. In some cases, such identification information may also be used for authentication purposes. Many variations are possible.

In this manner, a data storage device according to certain aspects can implement host independent control by using an integrated or external control device that can send host commands that do not involve data transfer when a host is not readily available. For example, a user may want to quickly format the data storage device or lock the data storage device (e.g., a USB flash drive) before giving the data storage device to another user, but may not be in an environment where the user can easily connect to a host. The control device can provide an alternate way of sending format, lock, or other commands in such situations. In certain cases, when a data storage device is not connected to a host over a physical connection, the data storage device may be able to connect to a host over a wireless connection and receive commands over the wireless connection. Using a control device can provide a simpler and more efficient way of sending certain host commands, for example, in situations where the user wants to perform operations like format, lock, etc. that do not involve data transfer.

As described above, a control device does not need a dedicated processor that can support all host commands as in a typical host that controls storage devices. In addition, the data storage device does not need to implement hardware and/or firmware handling for a dedicated communication protocol for command and response packet processing in connection with use of a control device. Authentication can provide security when using a control device to send commands. Since authentication functionality can be integrated within the data storage device and be available when a command is sent, a unique control device per user is not required. Any device capable of sending compatible inputs or signals may be used. In this way, a data storage device implementing host independent control can provide flexibility and reduce host dependency for certain commands and/or operations.

FIG. 5 illustrates a workflow process 500 for providing host independent control in a data storage device, according to one or more embodiments. The workflow process 500 may be implemented by a data storage device, such as a data storage device 100, 200, 300, 400 in FIGS. 1-4. For example, the workflow process 500 may be performed in part or in whole by a data storage device or one of its components, such as control circuitry, a processor, or a host independent control manager 110, 210. For illustrative purposes, the process 500 is explained below in connection with the data storage device 200 in FIG. 2. Certain details relating to the process 500 are explained in more detail with respect to FIGS. 1-4. Depending on the embodiment, the process 500 may include fewer or additional blocks, and the blocks may be performed in an order that is different from illustrated.

The process 500 starts at block 505. At block 510, the data storage device 200 can receive an input from a control device. For example, the control device can be the same as or similar to a control device 140, 240, 340, 408 in FIGS. 1-4. The control device can be any type of device that can send a command without being a typical or traditional host that supports all host commands that can be sent to the data storage device 200. The control device can be integrated or embedded in the data storage device 200 or external to the data storage device 200, depending on the embodiment.

At block 515, the data storage device 200 can authenticate a user that is sending an input via the control device. The data storage device 200 can proceed to subsequent blocks if authentication of the user is successful. In some cases, block 515 can be optional.

At block 520, the data storage device 200 can determine whether a host is available. If a host is available at block 520, the data storage device 200 can discard the input from the control device at block 525. The process 500 ends at block 540.

If a host is not available at block 520, the data storage device 200 can determine a host command to which the input is mapped at block 530. At block 535, the data storage device 200 can perform one or more operations associated with the host command. The data storage device 200 may display or indicate progress or status associated with the host command and/or the operation(s). The process 500 ends at block 540.

FIG. 6 illustrates a workflow process 600 for providing host independent control in a data storage device, according to one or more embodiments. The workflow process 600 may be implemented by a data storage device, such as a data storage device 100, 200, 300, 400 in FIGS. 1-4. For example, the workflow process 600 may be performed in part or in whole by a data storage device or one of its components, such as control circuitry, a processor, or a host independent control manager 110, 210. For illustrative purposes, the process 600 is explained below in connection with the data storage device 200 in FIG. 2. Certain details relating to the process 600 are explained in more detail with respect to FIGS. 1-5. Depending on the embodiment, the process 600 may include fewer or additional blocks, and the blocks may be performed in an order that is different from illustrated.

At block 605, the data storage device 200 can detect an input from a control device using a sensor 208, where the data storage device 200 includes a non-volatile memory 204, the sensor 208, and control circuitry 202, and is configured to receive commands from one or more hosts or one or more control devices. In some embodiments, the control device can be a wavelength emitter. The sensor 208 can be a wavelength sensor. The input can be a wavelength, and a specified wavelength can be mapped to a command. In certain embodiments, the sensor 208 can be a fingerprint sensor. The input can be a fingerprint, and a specified fingerprint can be mapped to a command. In some embodiments, the sensor 208 can be configured to function as the control device. In certain embodiments, the data storage device 200 can further include an authenticator 216.

In some embodiments, the input from the control device is may be sent to the data storage device 200 without using a communication protocol used by a host. In certain embodiments, the control device does not include a processor capable of processing commands involving data transfer and/or communicating with the data storage device 200 using a communication protocol used by a host.

At block 610, the data storage device 200 can determine whether the data storage device 200 is connected to a host.

At block 615, the data storage device 200 can, in response to determining that the data storage device is not connected to a host, determine a command associated with the input, where the input is mapped to a specified command not involving data transfer. For example, the command is a host command that can be performed without a connection to a host. In some embodiments, the command can include one or more of: a lock command, an unlock command, an erase command, a format command, a power on command, a power off command, a sleep command, or a wakeup command.

At block 620, the data storage device 200 can perform one or more operations associated with the command. In certain embodiments, the data storage device 200 may include an indicator that can indicate or display a status relating to the command and/or the one or more operations.

In some embodiments, the data storage device 200 can, in response to determining that the data storage device 200 is connected to a host, discard the input from the control device. In certain embodiments, the data storage device 200 can toggle between receiving a command from a host and a command from a control device.

Example Data Storage Device and Host System

Figure 7:
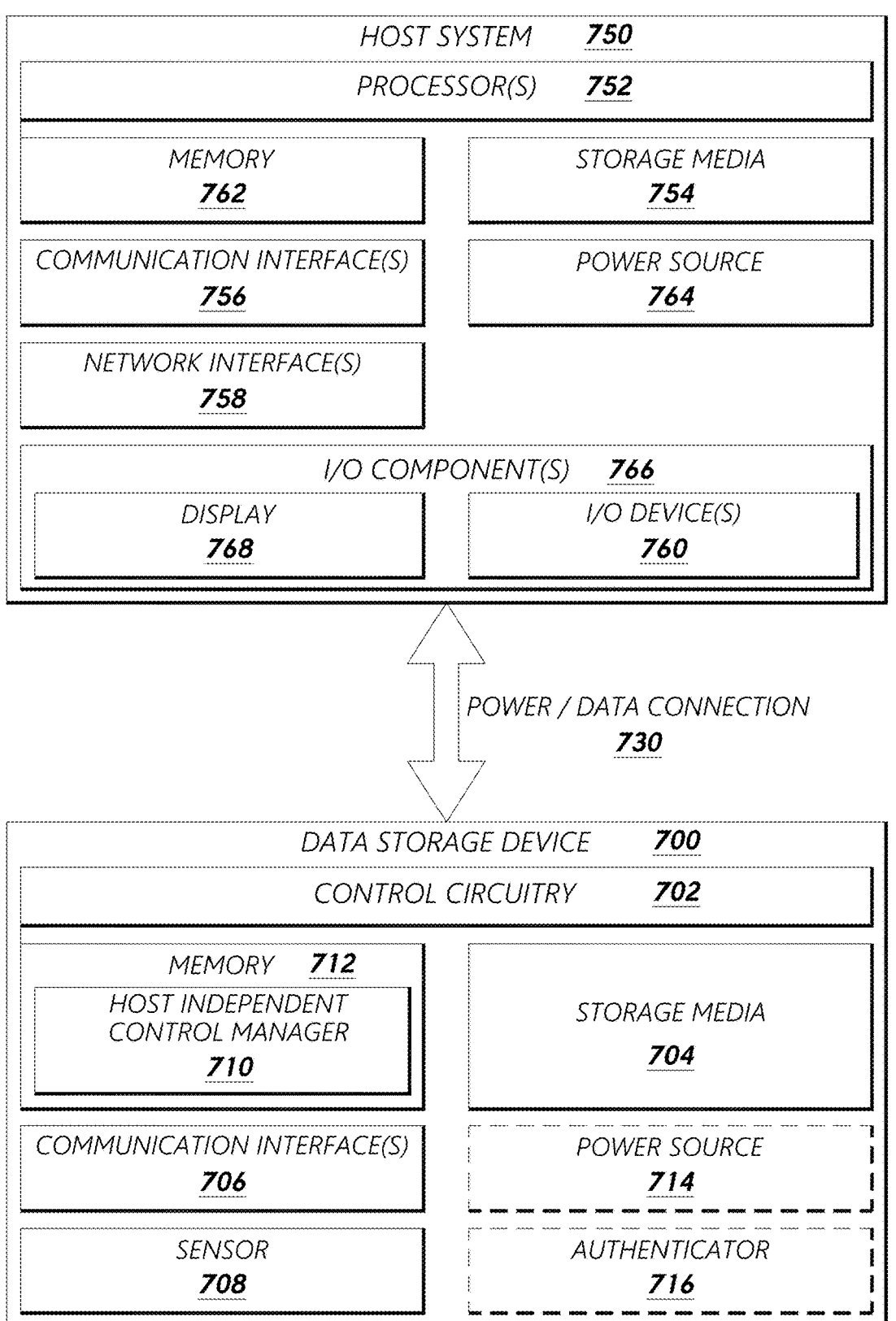
FIG. 7 illustrates a block diagram providing example details of a data storage device and a host system, according to certain embodiments.

FIG. 7 illustrates example details of a data storage device 700 and a host system 750, according to certain embodiments. As illustrated, the host system 750 can include one or more of the following components, devices, modules, and/or units (referred to herein as "components"), either separately/individually and/or in combination/collectively: one or more processors 752, such as central processing units (CPUs) or other type of processor, memory 762, one or more communication interfaces 756, one or more network interfaces 758, a power source 764 (e.g., battery or power supply unit), and/or one or more I/O components 766.

In some embodiments, the host system 750 can comprise a housing/enclosure configured and/or dimensioned to house or contain at least part of one or more of the components of the host system 750. In some embodiments, the storage media 754 may be housed internally in the enclosure of the host system 750. For example, the host system 750 may be a server or desktop system in case or rack mount enclosure with one or more storage drives in the case or enclosure. The host system 750 may be in a first enclosure, while the data storage device 700 may be external to the host system, being in a second enclosure different from the first enclosure.

The memory 762 can employ a variety of storage technologies and/or form factors and can include various types of volatile memory, such as Random Access Memory (RAM). RAM is a type of computer memory that serves as a temporary storage area for data and instructions that are actively being used by a computer's operating system, applications, and processes. RAM is volatile memory, meaning that its contents are lost when the computer is powered off or restarted. RAM provides fast and temporary access to data, enabling the processor 752 to quickly retrieve and manipulate the information it needs to perform tasks. The memory 762 can include programs that are running on the host system 750. The memory 762 may include a program, driver, browser extension, or the like that runs on a processor of the host system 750.

In addition, the host system 750 may also include non-volatile memory or storage media 754 for permanently storing data, such as important files. The storage media 754 may be an internal storage drive, such as an SSD, SSHD, or HDD. A permanent copy of any program can be stored in the storage media 754 and then copied to the memory 762 for running the program.

The one or more communication interfaces 756 can be a data interface that includes connectors, cables, and/or protocols for connection, communication, and/or power supply between host systems and the data storage device 700. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 700, such as male or female Type A, Type B, Type C, mini, and/or micro connectors. Other data interface standards can also be used, such as external SATA (eSATA), ExpressCard, FireWire (IEEE 1364), and Thunderbolt. The data interface can include a port for connecting with a cable and/or a corresponding port on the data storage device 700, forming a power/data connection 730 with the data storage device 700.

The power source 764 can be configured to provide/manage power for the host system 750. The power source 764 can comprise one or more devices and/or circuitry configured to provide a source of power and/or provide power management functionality. Moreover, in some embodiments the power source 764 includes a mains power connector that is configured to couple to an alternating current (AC) or direct current (DC) mains power source. In some embodiments, the power source can include one or more batteries, such as a lithium-based battery, a lead-acid battery, an alkaline battery, and/or another type of battery.

The one or more I/O components 766 can include a variety of components to receive input and/or provide output. The one or more I/O components 766 can be configured to receive touch, speech, gesture, biometric data, or any other type of input. For example, the one or more I/O components 766 can be used to provide input regarding control of the host system 750, such as opening files, entering logins, plays, and/or changing settings. As shown, the one or more I/O components 766 can include a display 768 configured to display data and various user interfaces. The display 768 can include one or more liquid crystal displays (LCD), light-emitting diode (LED) displays, organic LED displays, plasma displays, electronic paper displays, and/or any other type(s) of technology. In some embodiments, the display 768 can include one or more touchscreens configured to receive input and/or display data. Further, the one or more I/O components 766 can include the one or more input/output devices 760, which can include a touchscreen, touch pad, controller, mouse, keyboard, wearable device (e.g., optical head-mounted display), virtual or augmented reality device (e.g., head-mounted display), etc.

As illustrated, the data storage device 700 can include one or more of the following components, devices, modules, and/or units (referred to herein as "components"), either separately/individually and/or in combination/collectively: control circuitry 702, storage media 704, communication interfaces 706, memory 712, a sensor 708, optionally an authenticator 716, and/or optionally a power source 714 (e.g., battery or power supply unit). In some embodiments, the data storage device 700 can comprise a housing/enclosure configured and/or dimensioned to house or contain the components of the data storage device 700. In some examples, the data storage device 700 does not have its own power source but receives power only from the host system 750 via the power/data connection 730.

The data storage device 700 may be an external storage drive, SD card, flash drive, or a USB memory stick that uses semiconductor memory as the storage media. For example, the data storage device 700 may be an external drive that is connected to the host system 750 via an external port, such as USB. In other examples, the data storage device 700 may be an SD card, a microSD card, or another type of flash card that is readable from a memory reader of the host system 750. In other implementations, the data storage device 700 may be an external storage drive that uses an HDD that uses magnetic disks as the storage media, an SSHD that uses a combination of semiconductor memory and magnetic disk technology, or a tape drive that uses tape media.

Although certain components of the data storage device 700 and host system 750 are illustrated in FIG. 7, it should be understood that additional components not shown can be included in embodiments in accordance with the present disclosure. Furthermore, certain of the illustrated components can be omitted in some embodiments. Although the control circuitry 702 is illustrated as a separate component, it should be understood that any or all of the remaining components of the data storage device 700 can be embodied at least in part in the control circuitry 702. That is, the control circuitry 702 can include various devices (active and/or passive), semiconductor materials and/or areas, layers, regions, and/or portions thereof, conductors, leads, vias, connections, and/or the like, wherein one or more of the other components of the data storage device 700 and/or portion(s) thereof can be formed and/or embodied at least in part in/by such circuitry components/devices.

The various components of the data storage device 700 can be electrically and/or communicatively coupled using certain connectivity circuitry/devices/features, which can or may not be part of the control circuitry 702. For example, the connectivity feature(s) can include one or more printed circuit boards configured to facilitate mounting and/or interconnectivity of at least some of the various components/circuitry of the data storage device 700. In some embodiments, two or more of the control circuitry 702, the storage media 704, the communication interface(s) 706, the memory 712, and/or the power source 714, can be electrically and/or communicatively coupled to each other.

The control circuitry 702 can include hardware and/or software (e.g., firmware) for providing host independent control, such as a host independent control manager 710. The host independent control manager 710 may be implemented in firmware, which may be run on a controller chip. In some implementations, the host independent control manager 710 may be a specialized, hardware-based chip for providing host independent control. The host independent control manager 710 may be implemented as one or more components or one or more modules.

The storage media 704 can utilize various types of non-volatile memory (NVM) to permanently store data. NVM is a type of computer memory that can retain stored information even after power is removed. For example, the storage media 704 can include one or more magnetic disks and/or semiconductor memory. The semiconductor memory can include any of various memory technologies, such as NAND memory and its variations like SLC, eMLC (Enterprise Multi Level Cell), MLC, TLC, and QLC. New types of emerging non-volatile memory could also be used such as Program in Place or Storage Class Memory (SCM) such as ReRam, Phase-Change Memory (PCM), and Magnetoresistive Random-Access Memory (MRAM).

The one or more communication interfaces 706 can be configured to communicate with one or more device/sensors/systems. For example, the one or more communication interfaces 706 can send/receive data over a network. A network in accordance with embodiments of the present disclosure can include a local area network (LAN), wide area network (WAN) (e.g., the Internet), personal area network (PAN), body area network (BAN), etc.

The one or more communication interfaces 706 can be a data interface that includes connectors, cables, and/or protocols for connection, communication, and/or power supply between the host system 750 and the data storage device 700. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 700, such as male or female Type A, Type B, Type C, mini, and/or micro connectors. Other data interface standards can also be used, such as external SATA (eSATA), ExpressCard, FireWire (IEEE 1364), and Thunderbolt. The data interface can include a port for connecting with a cable and/or a corresponding port on the host system 750, forming the power/data connection 730.

The optional power source 714 can be configured to provide/manage power for the data storage device 700. In some embodiments, the power source can include one or more batteries, such as a lithium-based battery, a lead-acid battery, an alkaline battery, and/or another type of battery. In some embodiments the power source 714 includes a mains power connector that is configured to couple to an alternating current (AC) or direct current (DC) mains power source. However, in some embodiments, the data storage device 700 may not include an internal power source but be configured to receive power through the communication interface 706, such as via a USB connection.

The term "control circuitry" is used herein according to its broad and ordinary meaning, and can refer to any collection of one or more processors, processing circuitry, processing modules/units, chips, dies (e.g., semiconductor dies including one or more active and/or passive devices and/or connectivity circuitry), microprocessors, micro-controllers, digital signal processors, microcomputers, central processing units, graphics processing units, field programmable gate arrays, programmable logic devices, state machines (e.g., hardware state machines), logic circuitry, analog circuitry, digital circuitry, and/or any device that manipulates signals (analog and/or digital) based on hard coding of the circuitry and/or operational instructions. They may be configured to work individually or in combination. Control circuitry can further comprise one or more data storage devices, which can be embodied in a single memory device, a plurality of memory devices, and/or embedded circuitry of a device. Such data storage can comprise read-only memory, random access memory, volatile memory, non-volatile memory, static memory, dynamic memory, flash memory, cache memory, data storage registers, and/or any device that stores digital information. It should be noted that in embodiments in which control circuitry comprises a hardware state machine (and/or implements a software state machine), analog circuitry, digital circuitry, and/or logic circuitry, data storage device(s)/register(s) storing any associated operational instructions can be embedded within, or external to, the circuitry comprising the state machine, analog circuitry, digital circuitry, and/or logic circuitry.

The term "memory" is used herein according to its broad and ordinary meaning and can refer to any suitable or desirable type of computer-readable media. For example, computer-readable media can include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other types of data.

Computer-readable media that can be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic data storage devices, or any other non-transitory medium that can be used to store information for access by a computing device. As used in certain contexts herein, computer-readable media may not generally include communication media, such as modulated data signals and carrier waves. As such, computer-readable media should generally be understood to refer to non-transitory media.

Additional Embodiments

Those skilled in the art will appreciate that in some embodiments, other types of data storage devices can be implemented while remaining within the scope of the present disclosure. In addition, the actual steps taken in the processes discussed herein may differ from those described or shown in the figures. Depending on the embodiment, certain of the steps described above may be removed, others may be added, and the order may be rearranged.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer data storage device or collection of data storage devices. Some or all of the methods may alternatively be embodied in specialized computer hardware.

What is claimed is:

1. A data storage device comprising:
   a non-volatile memory;
   a sensor configured to detect an input from a control device; and
   control circuitry configured to:
   receive commands from one or more hosts or one or more control devices;
   detect an input from a control device using the sensor;
   determine whether the data storage device is connected to a host;
   in response to determining that the data storage device is not connected to a host, determine a command associated with the input, wherein the input is mapped to a specified command not involving data transfer; and
   perform one or more operations associated with the command.

2. The data storage device of claim 1, wherein the control device is a wavelength emitter.

3. The data storage device of claim 2, wherein the sensor is a wavelength sensor.

4. The data storage device of claim 3, further comprising an authenticator.

5. The data storage device of claim 2, wherein the input is a wavelength and a specified wavelength is mapped to a command.

6. The data storage device of claim 1, wherein the sensor is a fingerprint sensor.

7. The data storage device of claim 6, wherein the input is a fingerprint and a specified fingerprint is mapped to a command.

8. The data storage device of claim 6, wherein the sensor is configured to function as the control device.

9. The data storage device of claim 1, wherein the command is a host command that can be performed without a connection to a host.

10. The data storage device of claim 1, wherein the control circuitry is further configured to, in response to determining that the data storage device is connected to a host, discard the input from the control device.

11. The data storage device of claim 1, wherein the control circuitry is further configured to toggle between receiving a command from a host and a command from a control device.

12. The data storage device of claim 1, wherein the command includes one or more of: a lock command, an unlock command, an erase command, a format command, a power on command, a power off command, a sleep command, or a wakeup command.

13. A method of providing host independent control in a data storage device, the method comprising:

detecting, by control circuitry of a data storage device, an input from a control device using a sensor, wherein the data storage device includes a non-volatile memory, the sensor, and the control circuitry, and is configured to receive commands from one or more hosts or one or more control devices;

determining, by the control circuitry, whether the data storage device is connected to a host;

in response to determining that the data storage device is not connected to a host, determining, by the control circuitry, a command associated with the input, wherein the input is mapped to a specified command not involving data transfer; and performing, by the control circuitry, one or more operations associated with the command.

14. The method of claim 13, wherein the control device is a wavelength emitter and the sensor is a wavelength sensor.

15. The method of claim 14, wherein the input is a wavelength and a specified wavelength is mapped to a command.

16. The method of claim 13, wherein the sensor is a fingerprint sensor.

17. The method of claim 16, wherein the input is a fingerprint and a specified fingerprint is mapped to a command.

18. The method of claim 16, wherein the sensor is configured to function as the control device.

19. The method of claim 13, wherein the command includes one or more of: a lock command, an unlock command, an erase command, a format command, a power on command, a power off command, a sleep command, or a wakeup command.

20. A data storage device comprising:

a non-volatile memory;

a sensor configured to detect an input from a control device; and controller means configured to:

receive commands from one or more hosts or one or more control devices;

detect an input from a control device using the sensor;

determine whether the data storage device is connected to a host;

in response to determining that the data storage device is not connected to a host, determine a command associated with the input, wherein the input is mapped to a specified command not involving data transfer; and perform one or more operations associated with the command.

* * * * *